United States Patent
Antusiak et al.

(10) Patent No.: US 11,222,002 B2
(45) Date of Patent: Jan. 11, 2022

(54) SYSTEM AND METHOD FOR COHESIVE SHARED MULTI-DATA STRUCTURE LIFECYCLE

(71) Applicant: Arista Networks, Inc., Santa Clara, CA (US)

(72) Inventors: Jonathan Antusiak, Vancouver (CA); Christopher Elisha Neilson, Vancouver (CA); Sebastian Sapa, Vancouver (CA); Duncan Stuart Ritchie, Bowen Island (CA)

(73) Assignee: Arista Networks, Inc., Santa Clara, CA (US)

( * ) Notice: Subject to any disclaimer, the term of this patent is extended or adjusted under 35 U.S.C. 154(b) by 100 days.

(21) Appl. No.: 16/709,625

(22) Filed: Dec. 10, 2019

(65) Prior Publication Data

US 2020/0242099 A1 Jul. 30, 2020

Related U.S. Application Data

(60) Provisional application No. 62/797,407, filed on Jan. 28, 2019.

(51) Int. Cl.
*G06F 16/00* (2019.01)
*G06F 16/23* (2019.01)
(Continued)

(52) U.S. Cl.
CPC .......... *G06F 16/2336* (2019.01); *G06F 9/544* (2013.01); *G06F 16/22* (2019.01)

(58) Field of Classification Search
CPC .............. G06F 16/313; G06F 16/3334; G06F 16/3344; G06F 16/36; G06F 40/20; G06F 40/242; G06F 12/0831; G06F 12/1027; G06F 12/1045; G06F 12/1072; G06F 2212/301; G06F 16/14; G06F 16/148; G06F 16/1748; G06F 16/176; G06F 16/2272; G06F 16/322; G06F 16/325; G06F 16/3331; G06F 16/954; G06F 9/541; G06F 16/252;
(Continued)

(56) References Cited

U.S. PATENT DOCUMENTS

| | | | | |
|---|---|---|---|---|
| 6,199,203 | B1 * | 3/2001 | Saboff | G06F 8/656 |
| | | | | 717/168 |
| 6,971,096 | B1 * | 11/2005 | Ankireddipally | G06F 9/5038 |
| | | | | 707/999.1 |
| 2002/0078335 | A1 * | 6/2002 | Cabrera | G06F 3/0683 |
| | | | | 713/1 |

* cited by examiner

*Primary Examiner* — Shyue Jiunn Hwa
(74) *Attorney, Agent, or Firm* — Chamberlain, Hrdlicka, White, Williams & Aughtry

(57) ABSTRACT

Techniques are described herein for managing data structure groups. Such techniques may include providing to a data structure group, by a reader, a plurality of data structure identifiers including a first data structure identifier and a second data structure identifier; mounting, by the data structure group, a first data structure identified by the first data structure identifier and including a first instance identifier; mounting, by the data structure group, a second data structure identified by the second data structure identifier and including a second instance identifier; making a first determination that the first data structure and the second data structure are mounted; making a second determination that the first instance identifier and the second instance identifier match; and marking, based on the first determination and the second determination, the data structure group as ready-to-read.

18 Claims, 3 Drawing Sheets

(51) Int. Cl.
*G06F 9/54* (2006.01)
*G06F 16/22* (2019.01)

(58) Field of Classification Search
CPC ...... G06F 3/0481; G06F 16/84; G06F 16/211; G06F 16/212; G06F 16/248; G06F 16/951; G06F 8/24; G06N 5/02; G06N 7/005; G06N 5/022; G06N 5/00; Y04S 10/50; G06Q 10/06; G06Q 10/087; G06Q 10/10; G06Q 10/20; G06Q 20/10; G06Q 30/0222; G06Q 30/0283; G06Q 30/04; G06Q 30/0601; G06Q 40/00; G06Q 40/04; G06Q 40/12; G06Q 40/123; G06Q 40/125

See application file for complete search history.

SYSTEM AND METHOD FOR COHESIVE SHARED MULTI-DATA STRUCTURE LIFECYCLE

CROSS REFERENCE TO RELATED APPLICATIONS

This patent application claims the benefit of U.S. Provisional Patent Application Ser. No. 62/797,407 filed on Jan. 28, 2019 under 35 U.S.C. § 119(e). U.S. Provisional Patent Application Ser. No. 62/797,407 is incorporated herein by reference in its entirety.

BACKGROUND

Computing devices (e.g., network devices) may include shared data structures that refer to one another in some way. For a variety of reasons, the references between such shared data structures may become invalid, which may lead to incorrect device operation.

SUMMARY

In general, in one aspect, embodiments described herein relate to a method for managing data structure groups. In one or more embodiments, the method includes providing to a data structure group, by a reader, a plurality of data structure identifiers including a first data structure identifier and a second data structure identifier. In one or more embodiments, the method also includes mounting, by the data structure group, a first data structure identified by the first data structure identifier and including a first instance identifier. In one or more embodiments, the method also includes mounting, by the data structure group, a second data structure identified by the second data structure identifier and including a second instance identifier. In one or more embodiments, the method also includes making a first determination that the first data structure and the second data structure are mounted. In one or more embodiments, the method also includes making a second determination that the first instance identifier and the second instance identifier match. In one or more embodiments, the method also includes marking, based on the first determination and the second determination, the data structure group as ready-to-read.

In general, in one aspect, embodiments described herein relate to a non-transitory computer readable medium including instructions that, when executed by a processor, perform a method for managing shared memory data structures. In one or more embodiments, the method includes providing to a data structure group, by a reader, a plurality of data structure identifiers including a first data structure identifier and a second data structure identifier. In one or more embodiments, the method also includes mounting, by the data structure group, a first data structure identified by the first data structure identifier and comprising a first instance identifier. In one or more embodiments, the method also includes mounting, by the data structure group, a second data structure identified by the second data structure identifier and including a second instance identifier. In one or more embodiments, the method also includes making a first determination that the first data structure and the second data structure are mounted. In one or more embodiments, the method also includes making a second determination that the first instance identifier and the second instance identifier match. In one or more embodiments, the method also includes marking, based on the first determination and the second determination, the data structure group as ready-to-read.

Other aspects of the embodiments disclosed herein will be apparent from the following description and the appended claims.

DETAILED DESCRIPTION

Figure 1:
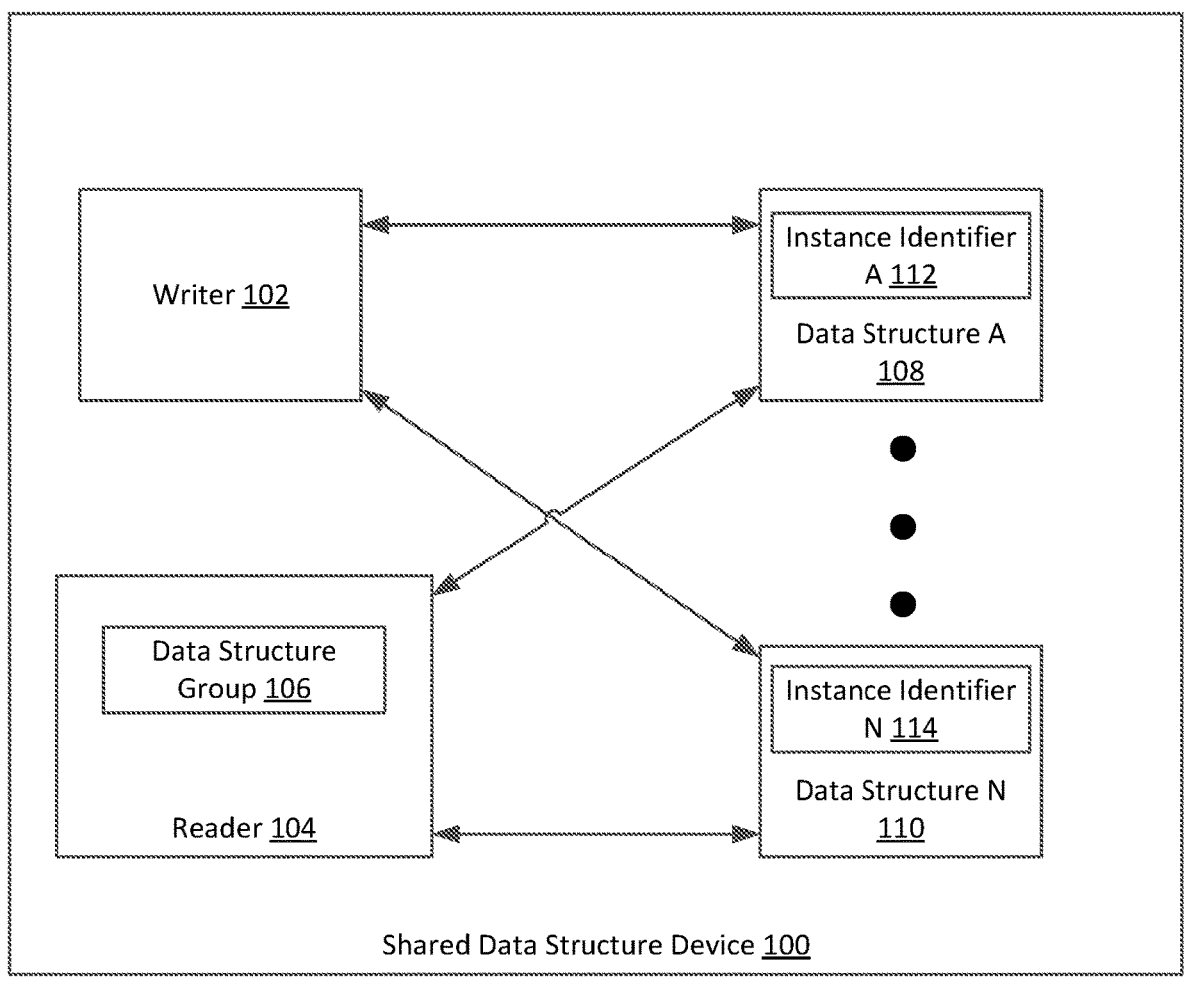
FIG. 1 shows a system in accordance with one or more embodiments described herein.

Specific embodiments will now be described with reference to the accompanying figures. In the following description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and instructions on non-transitory computer readable mediums for implementing data structure groups. Such data structure groups may exist to allow cohesive reading of a set of data structures included in the data structure group by one or more entities interested in reading the data structures. In one or more embodiments, the data structures are written by a single writer entity. Thus, at the very least, in one or more embodiments, a given data structure may be shared by a writer entity and one or more reader entities, making it a shared data structure. For example, a writer entity may be a process that executes an agent that is configured to obtain and share information, a reader entity may be another process that executes an agent that seeks to read the information, and the information may be shared between the two agents via one or more shared data structures.

In one or more embodiments, the data structures must be mounted before they may be read. In one or more embodiments, mounting is a process by which a data structure is made available to be read. In one or more embodiments, the data structures may include references to one another (e.g., pointers). Such references may exist within an address space (e.g., a virtual address space) that is associated with an instance of a given writer. In one or more embodiments, the data structures may exist at certain locations in storage or memory. However, the data structures may not be from the same instance of the writer entity, which may cause the references between the data structures to be incorrect. Such incorrect references between data structures of a given writer entity may cause incorrect operation of a computing device.

Therefore, in one or more embodiments, once all data structures in a data structure group are successfully mounted, one or more additional checks are performed to ensure that the data structures were created by the same instance of the writer entity and are part of the same logical instance set of data structures created by the writer entity, which may ensure that the references between the data structures are valid. In one or more embodiments, only upon successful mounting of the data structures and successful performance of the aforementioned one or more checks is the data structure group marked as ready to be read, which allows a reader entity to read the data from the data structures.

Over time, data structures may become unmounted, re-mounted, etc. Therefore, in one or more embodiments, the checks as to whether the data structures in a data structure group are mounted and from the same instance of a writer entity may be re-performed any number of times, with the data structure group oscillating between ready to read and not ready to read depending on whether the checks are successful at a given point in time.

FIG. 1 shows a system in accordance with one or more embodiments described herein. As shown in FIG. 1, the system includes a shared data structure device (100). The shared data structure device (100) may include any number of writers (e.g., writer (102)) and any number of readers (e.g., reader (104)). A reader (104) may include any number of data structure groups (e.g., data structure group (106)). A shared data structure device (100) may also include any number of data structures (e.g., data structure A (108), data structure N (110)). Each data structure (108, 110) may include an instance identifier (e.g. Instance identifier A (112), instance identifier N (114)). Each of these components is described below.

In one or more embodiments, a shared data structure device (100) is any computing device that includes any data structures stored in any persistent and/or non-persistent type of storage medium which are shared by any two or more entities executing on or otherwise accessing the data structures through the shared data structure device (100).

In one or more embodiments, a computing device is any device or any set of devices capable of electronically processing instructions and may include, but is not limited to, any of the following: one or more processors (e.g. Components that include integrated circuitry) (not shown), memory (e.g., random access memory (RAM)) (not shown), input and output device(s) (not shown), persistent storage (not shown), one or more physical interfaces (e.g., network ports) (not shown), any number of other hardware components (not shown) and/or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, the persistent storage (not shown) and/or memory (not shown) of a shared data structure device (100) may be one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage (not shown) and/or memory (not shown) of a shared data structure device (100) may be considered, in whole or in part, as non-transitory computer readable mediums storing software and/or firmware.

Such software and/or firmware may include instructions which, when executed by the one or more processors (not shown) or other hardware (e.g. Circuitry) of a shared data structure device (100), cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, the shared data structure device (100) is a network device. In one or more embodiments, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown). Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the physical network interfaces (i.e., ports) of the network device and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, the network device is part of a network (not shown). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., shared data structure device (100)) that facilitate network connectivity for one or more operatively connected devices (e.g., computing devices, data storage devices, other network devices, etc.) (not shown). In one or more embodiments, the network device and other devices within the network are arranged in a network topology (not shown). In one or more embodiments, a network topology is an arrangement of various devices of a network.

In one or more embodiments, a shared data structure device (100) includes at least one writer (102). In one or more embodiments, a writer (102) is any hardware (e.g., circuitry), software, firmware, or any combination thereof that includes functionality to write data to one or more data structures of the shared data structure device (100). In one or more embodiments, a writer (102) also includes functionality to obtain the data that it writes to the one or more data structures. Such data may be obtained locally (e.g. from other entities executing on the shared data structure device (100)) and/or obtained remotely (e.g. from any entities operatively connected to the shared data structure device (100)). As a non-limiting example, a writer (102) may be a process that executes a software agent using one or more processors of a shared data structure device (100). Such a software agent may be, for example, a networking protocol agent. Examples of such protocol agents include, but are not limited to a Border Gateway Protocol (BGP) agent or an Interior Gateway Protocol (IGP) agent (e.g., Open Shortest Path First (OSPF), Routing Information Protocol (RIP), Intermediate System to Intermediate System (IS-IS), Enhanced Interior Gateway Routing Protocol (EIGRP), etc.).

In one or more embodiments, a shared data structure device (100) includes any number of readers (e.g., reader (104)). In one or more embodiments, a reader (104) is any hardware (e.g., circuitry), software, firmware, or any combination thereof that includes functionality to read data from one or more data structures of the shared data structure device (100). Such data may be read for any reason relevant to a reader (104). In one or more embodiments, a reader (104) may be interested in reading any number of different data structures. As a non-limiting example, a reader (104) may be a process that executes a software agent using one or more processors of a shared data structure device (100). As another non-limiting example, a reader (104) may be an entity executing using (at least) one or more hardware components of a shared data structure device (100) to program routing information into hardware tables in a data plane (e.g., when the shared data structure device (100) is a network device).

In one or more embodiments, any writer (102) may be also be a reader, and any reader (104) may also be a writer. In such scenarios, a writer may be a writer as to certain data structures, and a reader of different data structures. Similarly, a reader may be a reader as to certain data structures, and a writer as to different data structures. As a non-limiting example, a routing information base (RIB) agent may be configured to read data (as a reader) from a number of data structures that include RIB configuration data from a variety of protocol agent writers, and also to be a writer of that information to other data structures. Such data written by the RIB agent may then, in turn, be read by other agents (as readers) that also write (as writers) the data in still other data structures. Such actions of reading and writing by various entities may, for example, facilitate, at least in part, a network device to perform processing of network traffic data units. In one or more embodiments, scenarios may exist (e.g., in a multi-threaded environment), there may be a single entity (e.g., a process) that is configured to both write to and read from one or more data structures.

In one or more embodiments, a shared data structure device (100) may include any number of data structures (108, 110). In one or more embodiments, a data structure is any structure (e.g., tables) that organizes, manages, and/or stores data for any purpose. In one or more embodiments, a data structure (108, 110) may be stored in any persistent and/or non-persistent storage medium (described above). As a non-limiting example, a data structure (108, 110) may be a table for storing information related to the routing and/or forwarding of network traffic data units, information relating to the management and/or operation of a shared data structure device (100), information relating to security of information and/or access of devices and/or networks, etc. In one or more embodiments, any number of data structures (108, 110) may each be portions of a larger aggregate data repository for storing information that may be related in some way (e.g., routing information). In one or more embodiments, a data structure (108, 110) is configured to be stored at a consistent physical location (e.g., in memory, in a file system, etc.), with information identifying the location being referred to as a data structure identifier. As an example, a data structure identifier may be a physical memory address. As another example, a data structure identifier may be a file system path. Data structure identifiers are not limited to the aforementioned examples.

In one or more embodiments, a data structure (108, 110) also stores an instance identifier (112, 114). In one or more embodiments, an instance identifier (112, 114) is any information (e.g., alpha-numeric character(s), series of binary bits, etc.) that identifies, at least, a writer (102) that created or otherwise modifies (e.g., writes to) the data structure. In one or more embodiments, a data structure (108, 110) is only associated with one writer (102) at a given time, and the instance identifier (112, 114) identifies a given instance of a writer (102).

For example, a writer (102) may be instantiated during the process of causing a shared data structure device (100) to transition from a non-operational state (e.g., powered off) to an operational state (e.g., powered on and performing its intended functionality). During such an instantiation, a writer (102) may be assigned an instance identifier (112, 114). In such a scenario, if a writer ceases existing or operating for some reason (e.g., a feature is disabled, a user or other software stops the process in which the writer executes, an error occurs, etc.), then the instance identifier for the writer is no longer valid. In the event that the writer (102) resumes operation (e.g., the feature is re-enabled, the error is fixed, etc.), the writer may be assigned a new instance identifier, which will be stored in the data structures (108, 110) to which the writer writes data.

In one or more embodiments, an instance identifier (112, 114) may, in addition to identifying an associated writer (102), include any other relevant information. For example, in one or more embodiments, the instance identifier (112, 114) includes both a process instance identifier (not shown) and a data structure instance identifier (not shown). In one or more embodiments, the process instance identifier portion of the instance identifier (112, 114) is associated with the instance of the writer writing data to the data structure storing the instance identifier. In one or more embodiments, the data structure instance identifier portion of the instance identifier (112, 114) identifies the particular instance of a data structure created by the same writer associated with the process instance identifier. For example, a writer (102) may, during continuous operation of a writer instance associated with a single process instance identifier, create, delete, re-create, re-delete, etc. the same data structure any number of times. In such a scenario, each new creation may be associated with a new data structure instance identifier, while maintaining the same process instance identifier of the instance identifier (112, 114) stored in the data structure (108, 110).

In one or more embodiments, a reader (104) includes any number of data structure groups (e.g., data structure group (106)). In one or more embodiments, a data structure group (106) is any hardware (e.g., circuitry), software, firmware, or any combination thereof that includes functionality to identify (e.g., by being configured with data structure identifiers after being instantiated) a set of data structures (108, 110) that a reader (104) is interested in reading data from, to mount such data structures and/or monitor whether the data structures are mounted, and to perform checks relating to the instance identifiers (112, 114) of data structures, (108, 110). For example, a data structure group (106) may be a software object (e.g., a C++ object) instantiated by a reader (104). Such an object may be configured with a set of data structure identifiers that identify data structures, and logic for performing operations relating to the data structures, such as checking whether the set of data structures are all mounted, setting watchers that monitor the state of data structures, checking whether the data structures all have at least partially matching instance identifiers, and/or notifying a reader whether the data structure group (106) is or is not ready to be read at a given time.

While FIG. 1 shows a configuration of components, other configurations may be used without departing from the scope of embodiments described herein. For example, there may be any number of writers. As another example, there may be any number of readers, each having any number of data structure groups. As another example, there may be any number of data structures, each having an instance identifier that may change during operation of a shared data structure device. As another example, there may be any number of components, software instances, etc. that are not shown in FIG. 1. Accordingly, embodiments disclosed herein should not be limited to the configuration of components shown in FIG. 1.

Figure 2:
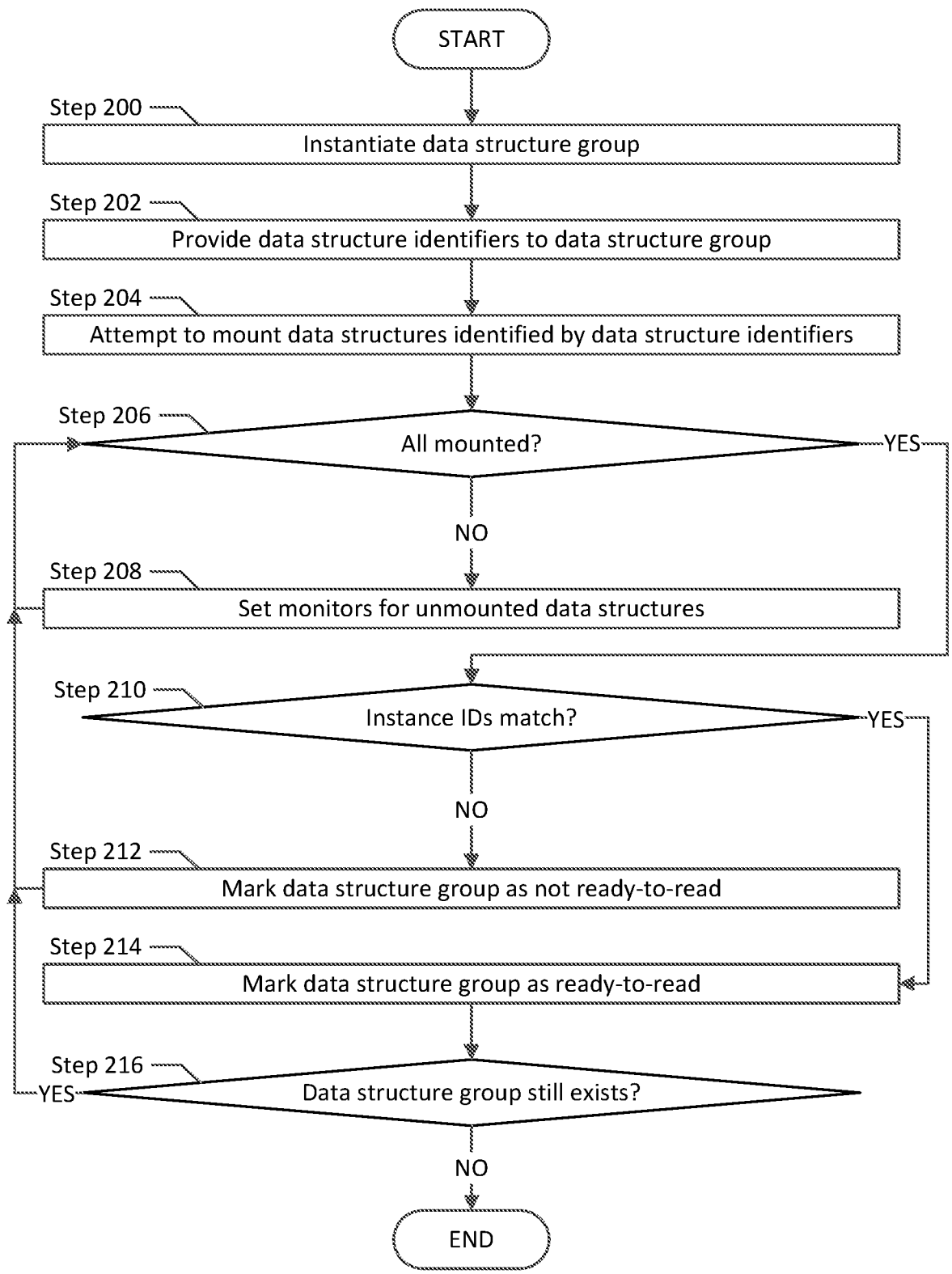
FIG. 2 shows a flowchart in accordance with one or more embodiments described herein.

FIG. 2 shows a flowchart describing a method for maintaining cohesiveness of shared data structures in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a data structure group is instantiated. In one or more embodiments, instantiating a data structure group includes creating an actual instance of a data structure group. In one or more embodiments, the data structure group is instantiated by a reader. In one or more embodiments, the reader is configured to instantiate a data structure group for each group of data structures from a given writer that the reader seeks to read from. In one or more embodiments, the data structure group is instantiated in order to facilitate maintaining the cohesiveness of the data structures in the data structure group during the period of time that the reader seeks to read data from the data structures in the data structure group. As an example, an instantiated data structure group may be initially empty of data structure information, and may also include logic to perform various tasks related to data structures (discussed further below). In one or more embodiments, an instantiated data structure group is initially marked as not ready to read, which alerts the reader that it cannot yet read the data structures of the data structure group and know they are coherent.

In Step 202, the reader provides information to the data structure group created in Step 200 relating to what set of data structures the reader wants in the data structure group. In one or more embodiments, each data structure is identified by a data structure identifier (e.g., a memory location, a file path, etc.) that represents the location in non-persistent and/or persistent storage of a shared data structure device where a given data structure is to be stored. In such embodiments, the reader provides the set of data structure identifiers to the data structure group that identifies the locations of the set of data structures to be included in the data structure group. In one or more embodiments, providing the data structure identifiers to the data structure group alerts the data structure group and its associated logic that the reader is interested in reading data from the set of data structures any time the data structure group is able to determine that the set of data structures are in a cohesive, ready to read state. In one or more embodiments, once the full set of data structure identifiers is provided to the data structure group by the reader, the data structure group is closed. In one or more embodiments, closing a data structure group becomes a closed set of data structures to which new data structures may not be added and/or existing data structures may not be removed. In one or more embodiments, a data structure group cannot be in a condition to be read by any reader until after it is a closed set. Said another way, in one or more embodiments, closing a data structure means that the set of data structures that make up the data structure group are the entirety of the data structures that are desired to be cohesive.

In Step 204, the data structure group attempts to mount each of the data structures identified by a data structure identifier provided by the reader to the data structure group in Step 202. In one or more embodiments, mounting a data structure includes making the data structure available to be accessed. In one or more embodiments, access of a data structure by a reader means making the data structure available to be read by the reader. In one or more embodiments, mounting a data structure includes associating the actual location of the data structure with an address in a virtual address space that may be understood by the reader, which may be associated with an instance of a writer that creates and/or writes to the data structure. In one or more embodiments, the data structure group attempts to mount each data structure in the data structure group.

In Step 206, a determination is made as to whether all data structures in the data structure group have been successfully mounted. In one or more embodiments, a successful mount of a data structure is a mount during which no error occurred, and the data structure is in a state that data could be read from it by a reader. In one or more embodiments, a mount may succeed when the data structure has already been successfully created by a writer, and a mount may fail when a data structure has not been, or at least not fully been, created or re-created by a writer. In one or more embodiments, if all data structures have been successfully mounted, the method proceeds to Step 210. In one or more embodiments, if one or more data structures in the data structure group have not been successfully mounted, the method proceeds to Step 208.

In Step 208, monitors are set by the data structure group to monitor the state of the data structure. In one or more embodiments, the monitor is a watch set up by logic of the device mount group that monitors the location at which the data structure being monitored is expected to exist and be mountable. In one or more embodiments, once any activity at such a location is detected by the watch, the data structure group receives a notification, which triggers the data structure group to attempt again to mount the data structure group. For example, the data structure group may be configured to use an inotify process as a mechanism to be alerted when changes at a file location occur where the data structure is supposed to be. After the attempted mount of the data structures for which mounting was determined to have failed in Step 206, the process returns to Step 206, where a determination is again made as to whether each data structure in the data structure group has been successfully mounted. The process continues until it is determined that all data structures in the data structure group have been successfully mounted, at which point the method proceeds to Step 210.

In Step 210, a determination is made as to whether each of the mounted data structures is storing an instance identifier that at least partially matches each of the others, meaning all the data structures were created by the same instance of a given writer. In one or more embodiments, the logic of the data structure group is configured to only determine if the instance identifier indicates that all data structures were created by the same instance of a writer. In such embodiments, the instance identifier may only include an instance identifier associated with a given writer, or the data structure group logic may be configured to only look at the portion of the instance identifier that includes such information (e.g., a process instance identifier portion). Such action may occur, for example, when pointers between the data structures of the data structure group are either actually pointing back and forth between the data structures, or, at the very least, may be doing so.

In one or more embodiments, the data structure group logic is more complex, and includes functionality to look at portions of the instance identifier other than the portion that merely identifies a writer instance. In one or more embodiments, a set of data structures may include certain one or more data structures that are considered 'enduring' data structures. In one or more embodiments, an enduring data structure is a data structure that is not destroyed and/or re-created during the lifecycle of a writer entity, and remain at the same data structure location during the lifecycle of the writer entity. Such enduring data structures may only be pointed to by other data structures, but may not point to any other data structures besides, perhaps, other enduring data structures. Alternatively, enduring data structures may also point to non-enduring data structures. Such enduring data structures, therefore, may be mapped to the same addresses in the virtual address space of a writer during the entirety of the existence of a given instance of the writer.

Meanwhile, other data structures in the data structure group may not be enduring data structures, and, as such, may point to other data structures and have pointers to them from other data structures. During the existence of a given instance of a writer, such other data structures may come into and/or out of existence and/or use by a writer for any reason. Therefore, for such other data structures, a writer, when re-creating the data structure, may cause the instance identifier to include the same process instance identifier (because it is the same instance of the writer), and also another portion of the instance identifier that is an updated data structure instance identifier. The updated data structure instance identifier may signify that the data structure is a new data structure instance, but created by the same writer as a previous instance of the identifier. In such a scenario, the determination of Step 210 requires, in one or more embodiments, that, at the very least, each process instance identifier of the instance identifiers of the data structures match. In one or more embodiments, the data structure instance identifiers are only required to match when they reference one another, as they will need to have coherent pointers to one another by virtue of being created as part of a same generation of data structure instances.

In one or more embodiments, when a determination is made that all or a portion of the instance identifiers of the data structures of the data structure group match appropriately (described above), the method proceeds to Step 214. If, on the other hand, the relevant all or portions of the instance identifiers of the data structures of the data structure group do not appropriately match, the method proceeds to Step 212.

In Step 212, if the data structure group was marked as not ready to read at any time in the method prior to Step 212, that marking is maintained. In one or more embodiments, if the data structure group has not yet been marked as not ready to read, the data structure group is so marked. In either case, once the data structure group has been marked as not ready to be read by a reader, the method returns to Step 206, the checks and monitors are performed or configured to ensure all data structures in the data structures in the data structure group are mounted, and the instance identifier check of Step 210 is again performed. This process repeats until it is determined by the logic of the device structure group that all data structures of the data structure group have been successfully mounted, and that the instance identifier check is successful. Only then does the method proceed to Step 214.

In Step 214, the data structure group is marked as ready to be read by the reader. Such a marking may include any scheme for alerting the reader that it may read the data structures of the data structure group. For example, a message may be sent to the reader. As another example, some stored information that is being monitored by the reader may be altered in a way that the reader understands means the data structures are ready to be read. Other schemes of alerting the reader that the data structures of the data structure group are ready to be read (i.e., they are coherent) may be used without departing from the scope of embodiments described herein.

In Step 216, a determination is made as to whether the data structure group still exists and/or whether the reader is still interested in reading the data structures therein. For as long as the reader is executing, the reader remains interested in reading the data structures of the data structure group, and the data structure group remains in existence, the method returns to Step 206 in order to continuously ensure the coherency of the data structures of the data structure group. Repeating Steps 206-Step 214 may cause the data structure group to alternate between not-ready-to-read and ready-to-read as circumstances described herein dictate. In the event that the data structure group ceases to exist, or the reader no longer seeks to read the data structures therein, the method ends.

Figure 3:
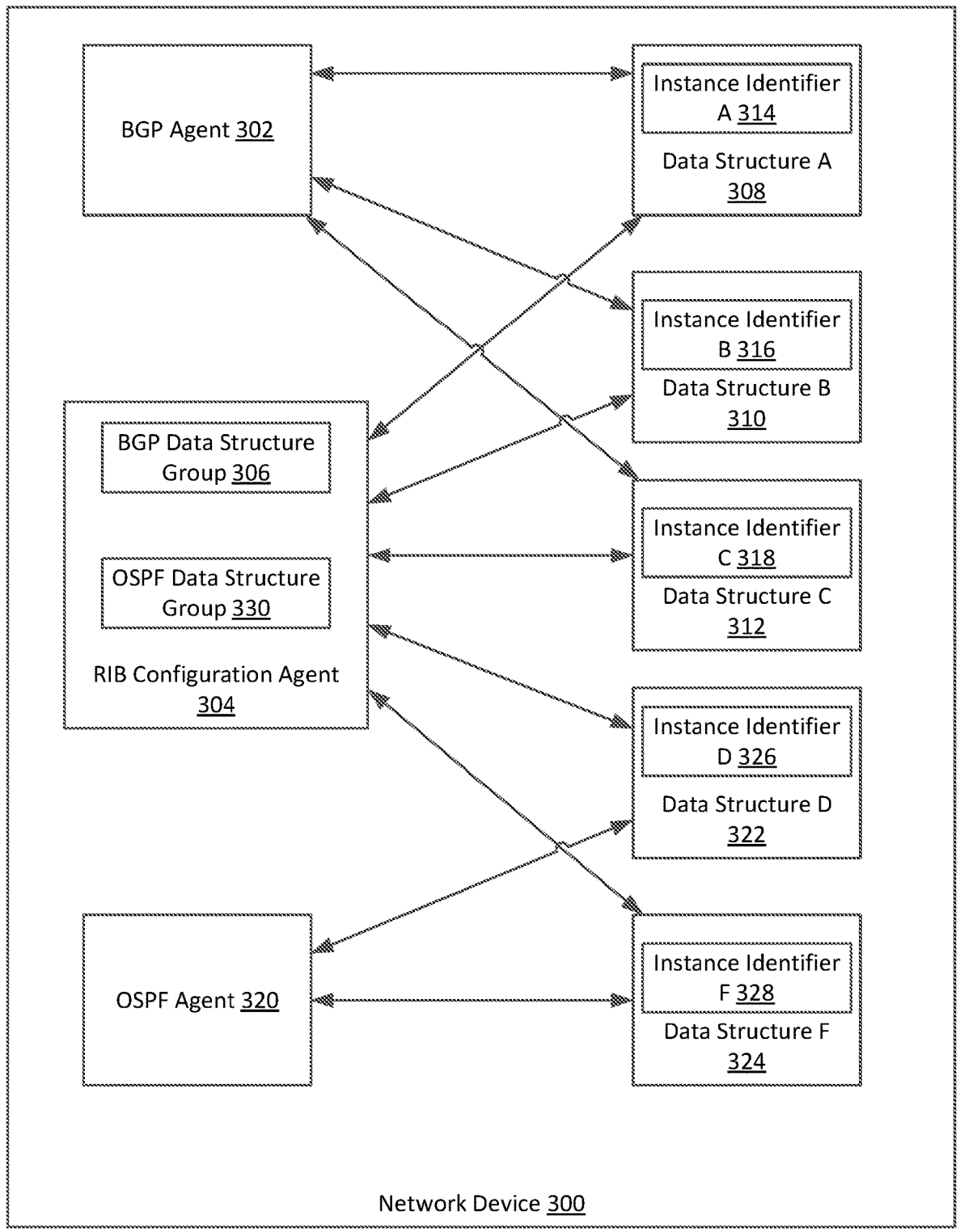
FIG. 3 shows an example in accordance with one or more embodiments described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which a network device (300) includes two writers, a BGP agent (302) and an OSPF agent (320). The BGP agent (302) is associated with and configured to write various items of BGP related information to data structure A (308), data structure B (310), and data structure C (312). The OSPF agent (320) is associated with and configured to write various items of OSPF related information to data structure D (322) and data structure F (324). The network device also includes a RIB configuration agent (304). The RIB configuration agent is configured to read both the BGP information and the OSPF information from the various data structures to be provided to be written to other data structures (not shown) that will be read by network device (300) platform agents (not shown) and, subsequently, written into hardware tables to facilitate processing, at least in part, of network traffic data units. The RIB configuration agent (304) is configured to instantiate a BGP data structure group (306) and an OSPF data structure group (330) in order to ensure that each of these data structure groups include coherent data structures before being ready to read.

In such a scenario, when the network device is powered on, the BGP agent (302), the OSPF agent (320), and the RIB configuration agent (304) are initialized. The RIB configuration agent (304) begins instantiating the BGP data structure group (306). Next, the RIB configuration agent provides the BGP data structure group with a data structure identifier for each of data structure A (308), data structure B (310), and data structure C (312).

Next, the RIB configuration agent (304) begins instantiating the OSPF data structure group (330). Next, the RIB configuration agent provides the OSPF data structure group with a data structure identifier for each of data structure D (322) and data structure F (324).

While the various data structure groups are being set up, the agents (302, 320) begin creating their respective data structures at the locations identified by the data structure identifiers provided to the data structure groups by the RIB configuration agent (304). The BGP-related data structures (308, 310, 312) are provided instance identifiers (314, 316, 318) associated with the current instance of the BGP agent (302). The OSPF-related data structures (322, 324) are provided instance identifiers (326, 328) associated with the current instance of the OSPF agent (320). The instance identifiers (326, 328) have two parts, because data structure D (322) is an enduring data structure that is not pointed to by other data structures, while data structure F (324) has pointers to data structure D (322). Therefore, instance identifiers (326, 328) each have a process instance identifier portion and a data structure instance identifier portion.

While the various data structures are being created by their respective writer agents, the data structure groups (306, 330) begin attempting to mount the data structures. The BGP data structure group (306) first successfully mounts data structure A (308). However, it is unable to successfully mount the other BGP-related data structures (310, 312). Accordingly, the BGP data structure group (306) sets a watch on the locations of data structure B (310) and data structure C (312). Later, the BGP data structure group (306), in response to setting the watches, receives messages that something has happened at the locations of data structure B (310) and data structure C (312). Therefore, BGP data structure group (306) again tries to mount the data structures, and is successful. Next, BGP data structure group (306) rechecks that all three BGP related data structures are mounted, and determines that they are.

Next, the BGP data structure group (306) checks the instance identifiers (314, 316, 318) of the BGP-related data structures, and determines that they all indicate being created by the same instance of the BGP agent (302). Therefore, the BGP data structure group (306) is marked as ready to read, and the RIB configuration agent (304) begins reading data from the BGP data structure group (306). The BGP data structure group (306) continues to monitor whether the BGP-related data structures are mounted and have matching instance identifiers. In the event that either is not true, the BGP data structure group (306) is marked as not ready to read, until such time as it becomes true again. The RIB configuration agent only reads data from data structures of the BGP data structure group (306) when the group is marked ready to read.

Meanwhile, in the same general time frame, the OSPF data structure group (330) first successfully mounts data structure D (322). However, it is unable to successfully mount the other OSPF-related data structure (324). Accordingly, the OSPF data structure group (330) sets a watch on the location of data structure F (324). Later, the OSPF data structure group (330), in response to setting the watches, receives messages that something has happened at the location of data structure F (324). Therefore, BGP data structure group (330) again tries to mount the data structure, and is successful. Next, OSPF data structure group (330) rechecks that both OSPF-related data structures are mounted, and determines that they are.

Next, the OSPF data structure group (330) checks the instance identifiers (326, 328) of the OSPF-related data structures, and determines that they all indicate being created by the same instance of the OSPF agent (320), because they each have the same process instance identifier portion of the instance identifier. At this point in time, the data structure identifier portion of the instance identifiers also match, though the check would pass even if that were not true, as data structure D (322) does not include any pointers to data structure F (324).

Therefore, the OSPF data structure group (330) is marked as ready to read, and the RIB configuration agent (304) begins reading data from the OSPF data structure group (330). The OSPF data structure group (330) continues to monitor whether the OSPF-related data structures are mounted and have matching process instance identifiers. In the event that either is not true, the OSPF data structure group (330) is marked as not ready to read, until such time as it becomes true again. The RIB configuration agent only reads data from data structures of the OSPF data structure group (330) when the group is marked ready to read.

Although not contemplated in this scenario, if the OSPF agent was creating a third data structure intended to be part of the OSPF data structure group, and that data structure and data structure F (324) mutually referred to one another, the OSPF data structure group (330) would also verify that they had matching data structure instance identifier portions of their respective instance identifiers before the OSPF data structure group could be marked as ready to read.

Embodiments described herein allow for a reader to only read sets of data structures that have been determined to be coherent, as they are concurrently mounted and have been created by the same instance of a writer. Moreover, certain embodiments allow for an additional coherency check between mutually referencing non-enduring data structures before a set of data structures may be read by a reader.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data structure groups, the method comprising:
providing to a data structure group, by a reader, a plurality of data structure identifiers comprising a first data structure identifier and a second data structure identifier;
mounting, by the data structure group, a first data structure identified by the first data structure identifier and comprising a first instance identifier, wherein the first data structure is an enduring data structure and the first instance identifier comprises a first process instance identifier and a first data structure instance identifier;
mounting, by the data structure group, a second data structure identified by the second data structure identifier and comprising a second instance identifier, wherein the second instance identifier comprises a second process instance identifier and a second data structure instance identifier;
making a first determination that the first data structure and the second data structure are mounted;
making a second determination that the first instance identifier and the second instance identifier match; and
marking, based on the first determination and the second determination, the data structure group as ready-to-read.

2. The method of claim 1, further comprising
attempting, by the data structure group and before mounting the second data structure, to mount the second data structure, wherein the mount of the second data structure is unsuccessful;
setting a monitor for the second data structure;
receiving a notification from the monitor that an event occurred at a second data structure location of the second data structure; and
mounting, based on the notification, the second data structure.

3. The method of claim 1, further comprising:
closing, before mounting the first data structure, the data structure group.

4. The method of claim 1, further comprising:
reading, by the reader, data from the data structure group based on the data structure group being marked as ready-to-read.

5. The method of claim 1, wherein:
the second data structure comprises a pointer to the first data structure, wherein the pointer is in a first address space of a first writer instance, and
the match of the first instance identifier and the second instance identifier guarantees that the pointer is valid.

6. The method of claim 1, further comprising:
making a third determination, after marking the data structure group as ready-to-read, that the second data structure is no longer mounted; and
marking, based on the third determination, the data structure group as not-ready-to-read.

7. The method of claim 6, further comprising:
setting, after marking the data structure group as not-ready-to-read, a monitor for the second data structure;
receiving a notification from the monitor that an event occurred at a second data structure location of the second data structure;
mounting, based on the notification, the second data structure;
making a fourth determination that the first data structure and the second data structure are mounted;
making a fifth determination that the first instance identifier and the second instance identifier match; and
marking, based on the fourth determination and the fifth determination, the data structure group as ready-to-read.

8. The method of claim 1, wherein the plurality of data structure identifiers further comprises a third data structure identifier that identifies a third data structure comprising a third instance identifier comprising a third process instance identifier and a third data structure instance identifier, and the method further comprises:
mounting, by the data structure group, the third data structure identified by the third data structure identifier;
making a third determination that the first data structure, the second data structure, and the third data structure are mounted;
making a fourth determination that the first instance identifier, the second instance identifier, and the third instance identifier match; and
marking, based on the third determination and the fourth determination, the data structure group as ready-to-read.

9. The method of claim 8, further comprising:
making a fifth determination, after marking the data structure group as ready-to-read, that the third data structure is no longer mounted;
marking, based on the fifth determination, the data structure group as not-ready-to-read;

setting, after marking the data structure group as not-ready-to-read, a monitor for the third data structure;
receiving a notification from the monitor that an event occurred at a third data structure location of the third data structure;
mounting, based on the notification, the third data structure;
making a sixth determination that the first data structure, the second data structure, and the third data structure are mounted;
making a seventh determination that the first process instance identifier, the second process instance identifier, and the third process instance identifier match;
making an eighth determination that the second data structure instance identifier and the third data structure instance identifier match; and
marking the data structure group as ready-to-read based on the sixth determination, the seventh determination, and the eighth determination.

10. A non-transitory computer readable medium comprising instructions that, when executed by a processor, perform a method for managing shared memory data structures, the method comprising:
providing to a data structure group, by a reader, a plurality of data structure identifiers comprising a first data structure identifier and a second data structure identifier;
mounting, by the data structure group, a first data structure identified by the first data structure identifier and comprising a first instance identifier, wherein the first data structure is an enduring data structure and the first instance identifier comprises a first process instance identifier and a first data structure instance identifier;
mounting, by the data structure group, a second data structure identified by the second data structure identifier and comprising a second instance identifier, wherein the second instance identifier comprises a second process instance identifier and a second data structure instance identifier;
making a first determination that the first data structure and the second data structure are mounted;
making a second determination that the first instance identifier and the second instance identifier match; and
marking, based on the first determination and the second determination, the data structure group as ready-to-read.

11. The non-transitory computer readable medium of claim 10, wherein the method performed by executing the instructions further comprises:
attempting, by the data structure group and before mounting the second data structure, to mount the second data structure, wherein the mount of the second data structure is unsuccessful;
setting a monitor for the second data structure;
receiving a notification from the monitor that an event occurred at a second data structure location of the second data structure; and
mounting, based on the notification, the second data structure.

12. The non-transitory computer readable medium of claim 10, wherein the method performed by executing the instructions further comprises:
closing, before mounting the first data structure, the data structure group.

13. The non-transitory computer readable medium of claim 10, wherein the method performed by executing the instructions further comprises:
reading, by the reader, data from the data structure group based on the data structure group being marked as ready-to-read.

14. The non-transitory computer readable medium of claim 10, wherein:
the second data structure comprises a pointer to the first data structure, wherein the pointer is in a first address space of a first writer instance, and
the match of the first instance identifier and the second instance identifier guarantees that the pointer is valid.

15. The non-transitory computer readable medium of claim 10, wherein the method performed by executing the instructions further comprises:
making a third determination, after marking the data structure group as ready-to-read, that the second data structure is no longer mounted; and
marking, based on the third determination, the data structure group as not-ready-to-read.

16. The non-transitory computer readable medium of claim 15, wherein the method performed by executing the instructions further comprises:
setting, after marking the data structure group as not-ready-to-read, a monitor for the second data structure;
receiving a notification from the monitor that an event occurred at a second data structure location of the second data structure;
mounting, based on the notification, the second data structure;
making a fourth determination that the first data structure and the second data structure are mounted;
making a fifth determination that the first instance identifier and the second instance identifier match; and
marking, based on the fourth determination and the fifth determination, the data structure group as ready-to-read.

17. The non-transitory computer readable medium of claim 10, wherein the plurality of data structure identifiers further comprises a third data structure identifier that identifies a third data structure comprising a third instance identifier comprising a third process instance identifier and a third data structure instance identifier, and the method further comprises:
mounting, by the data structure group, the third data structure identified by the third data structure identifier;
making a third determination that the first data structure, the second data structure, and the third data structure are mounted;
making a fourth determination that the first instance identifier, the second instance identifier, and the third instance identifier match; and
marking, based on the third determination and the fourth determination, the data structure group as ready-to-read.

18. The non-transitory computer readable medium of claim 17, wherein the method performed by executing the instructions further comprises:
making a fifth determination, after marking the data structure group as ready-to-read, that the third data structure is no longer mounted;
marking, based on the fifth determination, the data structure group as not-ready-to-read;
setting, after marking the data structure group as not-ready-to-read, a monitor for the third data structure;
receiving a notification from the monitor that an event occurred at a third data structure location of the third data structure;

mounting, based on the notification, the third data structure;
making a sixth determination that the first data structure, the second data structure, and the third data structure are mounted;
making a seventh determination that the first process instance identifier, the second process instance identifier, and the third process instance identifier match;
making an eighth determination that the second data structure instance identifier and the third data structure instance identifier match; and
marking the data structure group as ready-to-read based on the sixth determination, the seventh determination, and the eighth determination.

\* \* \* \* \*